(12) United States Patent
Kemmochi

(10) Patent No.: US 8,903,097 B2
(45) Date of Patent: Dec. 2, 2014

(54) INFORMATION PROCESSING DEVICE AND METHOD AND PROGRAM

(75) Inventor: Chisato Kemmochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 523 days.

(21) Appl. No.: 13/023,187

(22) Filed: Feb. 8, 2011

(65) Prior Publication Data

US 2011/0200210 A1 Aug. 18, 2011

(30) Foreign Application Priority Data

Feb. 17, 2010 (JP) ................ P2010-032045

(51) Int. Cl.
*H03G 3/20* (2006.01)
*H03G 5/00* (2006.01)
*H03G 9/00* (2006.01)
*H03G 3/00* (2006.01)
*H04B 15/00* (2006.01)
*H04M 19/04* (2006.01)
*H04M 9/08* (2006.01)

(52) U.S. Cl.
CPC .............. *H04M 19/04* (2013.01); *H04M 9/082* (2013.01)
USPC ............. 381/57; 381/101; 381/102; 381/107; 381/94.2; 381/94.3

(58) Field of Classification Search
CPC ... H04M 19/04; H04M 19/044; H04M 9/082; H04M 1/72569; H04M 2250/12
USPC ........ 381/93, 94.1, 94.2, 95, 96, 57, 381/101–104, 107, 98, 94.3; 379/390.01, 379/406.01, 406.02, 406.08, 41, 418
See application file for complete search history.

(56) References Cited

U.S. PATENT DOCUMENTS

| 7,469,155 | B2 * | 12/2008 | Chu ............................. 455/567 |
| 2003/0039352 | A1 * | 2/2003 | Joncour et al. ........... 379/390.01 |
| 2009/0225980 | A1 * | 9/2009 | Schmidt et al. .......... 379/406.02 |

FOREIGN PATENT DOCUMENTS

| JP | 2001-36604 | 2/2001 |
| WO | WO 2010092523 A1 * | 8/2010 |

* cited by examiner

*Primary Examiner* — Vivian Chin
*Assistant Examiner* — David Ton
(74) *Attorney, Agent, or Firm* — Finnegan, Henderson, Farabow, Garrett & Dunner, L.L.P.

(57) ABSTRACT

An information processing device includes: an output device configured to perform notification to a user by outputting ringing sound; a sound pickup device configured to pick up surrounding sound as ambient sound; an adaptive filtering process device configured to perform an adaptive filtering process using the picked-up ambient sound and the ringing sound output from the output device, to thereby extract, from the ambient sound, estimated environmental sound from which the ringing sound picked up by the sound pickup device has been removed; and a control device configured to control, on the basis of the feature quantity of a predetermined feature extracted from the estimated environmental sound, the adjustment of at least one of the sound volume and the sound quality of the ringing sound.

8 Claims, 10 Drawing Sheets

FIG. 6

| | SOUND VOLUME CONTROL STABILIZER INTERNAL MEMORY STATE | | | | SOUND VOLUME CONTROL STABILIZATION RESULT | SOUND VOLUME CONTROL SIGNAL GENERATOR OPERATION (EXAMPLE OF THRESHOLD VALUE OF 0.4) |
|---|---|---|---|---|---|---|
| | PRESENT | | | PAST | | |
| | 1 | 0.8 | 0.2 | -0.1 | | |
| WEIGHTING FACTOR A (HIGH REACTION SENSITIVITY) | 0.7 | 0.2 | 0.1 | 0.0 | 0.870 | CONTROL TO INCREASE SOUND VOLUME |
| WEIGHTING FACTOR B (STANDARD REACTION SENSITIVITY) | 0.25 | 0.25 | 0.25 | 0.25 | 0.475 | CONTROL TO INCREASE SOUND VOLUME |
| WEIGHTING FACTOR C (LOW REACTION SENSITIVITY) | 0.15 | 0.2 | 0.3 | 0.35 | 0.335 | GENERATE NO CONTROL SIGNAL |

INFORMATION PROCESSING DEVICE AND METHOD AND PROGRAM

BACKGROUND OF THE INVENTION

1. Field of the Invention

The present invention relates to an information processing device and method and a program, particularly to an information processing device and method and a program capable of, when performing notification to a user by using sound, more easily and reliably allowing the user to recognize the notification sound irrespective of the surrounding environment.

2. Description of the Related Art

In the past, the ringtone of a mobile phone has been configured to ring at the sound volume previously set by a user. In some cases, therefore, setting the ringtone to high sound volume in accordance with a noisy environment, for example, leads to loud ringing of the ringtone in a quiet cafe or the like and resultant nuisance to nearby people. Conversely, setting the ringtone to low sound volume to avoid the nuisance makes it difficult for the user to notice the ringtone in a noisy environment.

To allow the user to easily notice an incoming call without causing nuisance to nearby people, therefore, some mobile phones are prepared with ring patterns of the ringtone called step-up and step-down. Herein, step-up refers to a ring pattern in which the ringtone shifts to higher sound volume over time, and step-down refers to a ring pattern in which the ringtone shifts to lower sound volume over time.

Further, other mobile phones adjust the sound quality of the ringtone by using one of a plurality of previously downloaded parameters (see Japanese Unexamined Patent Application Publication No. 2001-36604, for example). This type of mobile phones pick up and analyze the surrounding sound, and select one of the plurality of parameters on the basis of the result of the analysis.

SUMMARY OF THE INVENTION

If a mobile phone is prepared with ring patterns of the ringtone designed for the mobile phone, as in the above-described case, the user previously selects the ring pattern in accordance with the usage environment.

It is now assumed, for example, that the user has set the ring pattern to the step-up so as not to miss an incoming call while paying attention not to cause nuisance to other people in a quiet environment. In such a case, it is difficult for the user to notice an incoming call in a noisy environment, such as a platform of a train station, until the ringtone reaches high sound volume, and it takes time for the user to notice the incoming call. As a result, disconnection or transfer of the call may occur in some cases.

To avoid such a situation, therefore, the user is asked to reset the ring pattern every time the environment surrounding the mobile phone changes, and is forced to perform considerably bothersome operations.

Further, in the mobile phones which analyze the picked-up sound and adjust the sound quality of the ringtone, not only environmental sound but also the ringtone is picked up. It is therefore difficult to select an appropriate parameter on the basis of the picked-up sound. Furthermore, the parameters are asked to be previously downloaded, and a parameter suitable for the surrounding environment is not prepared in some cases.

The present invention has been made in view of the above-described circumferences. It is desirable, when performing notification to a user by using sound, to more easily and reliably allow the user to recognize the notification sound irrespective of the surrounding environment.

An information processing device according to an embodiment of the present invention includes: output means for performing notification to a user by outputting ringing sound; sound pickup means for picking up surrounding sound as ambient sound; adaptive filtering process means for performing an adaptive filtering process using the picked-up ambient sound and the ringing sound output from the output means, to thereby extract, from the ambient sound, estimated environmental sound from which the ringing sound picked up by the sound pickup means has been removed; and control means for controlling, on the basis of the feature quantity of a predetermined feature extracted from the estimated environmental sound, the adjustment of at least one of the sound volume and the sound quality of the ringing sound.

The information processing device may further include frequency analysis means for performing frequency analysis on the estimated environmental sound, and the control means may control, on the basis of a frequency feature quantity obtained by the frequency analysis performed on the estimated environmental sound, the adjustment of the sound volume or the sound quality of the ringing sound.

The frequency analysis means may further perform the frequency analysis on the ringing sound, and the control means may control, on the basis of the frequency feature quantity of the estimated environmental sound and the frequency feature quantity of the ringing sound, the adjustment of the sound volume or the sound quality of the ringing sound.

The information processing device may further include time waveform analysis means for performing time waveform analysis on the estimated environmental sound and the ringing sound, and the control means may control, on the basis of the respective frequency feature quantities of the estimated environmental sound and the ringing sound and the respective time waveform feature quantities of the estimated environmental sound and the ringing sound obtained by the time waveform analysis, the adjustment of the sound volume or the sound quality of the ringing sound.

The control means may include sound volume control means for controlling, on the basis of the result of comparison between the respective time waveform feature quantities of the estimated environmental sound and the ringing sound and the result of comparison between the respective frequency feature quantities of the estimated environmental sound and the ringing sound, the adjustment of the sound volume of the ringing sound, and sound quality control means for controlling, on the basis of the frequency feature quantity of the estimated environmental sound, the adjustment of the sound quality of the ringing sound.

The sound volume control means may control, on the basis of the result of comparison between the time waveform feature quantities, the result of comparison between the frequency feature quantities, and a suppression amount of the ambient sound obtained by the adaptive filtering process, the adjustment of the sound volume of the ringing sound.

The information processing device may further include time waveform analysis means for performing time waveform analysis on the estimated environmental sound, and the control means may control, on the basis of a time waveform feature quantity obtained by the time waveform analysis performed on the estimated environmental sound, the adjustment of the sound volume or the sound quality of the ringing sound.

The information processing device may further include vibration means for vibrating to perform the notification to the user, and vibration control means for calculating, with the use of a propagation characteristic of the ringing sound between the output means and the sound pickup means obtained by the adaptive filtering process, a propagation characteristic feature quantity representing the degree of proximity of a nearby object to the information processing device, and controlling the vibration of the vibration means on the basis of the propagation characteristic feature quantity.

The information processing device may serve as a mobile phone, and the ringing sound may be sound for notifying the user of an incoming call. Further, the sound pickup means may be a microphone for telephone conversation configured to pick up the voice of the user during a telephone conversation using the mobile phone.

An information processing method or a program according to an embodiment of the present invention includes the steps of: causing output means to perform notification to a user by outputting ringing sound; causing sound pickup means to pick up surrounding sound as ambient sound; performing an adaptive filtering process using the picked-up ambient sound and the ringing sound output from the output means, to thereby extract, from the ambient sound, estimated environmental sound from which the ringing sound picked up by the sound pickup means has been removed; and controlling, on the basis of the feature quantity of a predetermined feature extracted from the estimated environmental sound, the adjustment of at least one of the sound volume and the sound quality of the ringing sound.

An embodiment of the present invention causes output means to perform notification to a user by outputting ringing sound, causes sound pickup means to pick up surrounding sound as ambient sound, performs an adaptive filtering process using the picked-up ambient sound and the ringing sound output from the output means, to thereby extract, from the ambient sound, estimated environmental sound from which the ringing sound picked up by the sound pickup means has been removed, and controls, on the basis of the feature quantity of a predetermined feature extracted from the estimated environmental sound, the adjustment of at least one of the sound volume and the sound quality of the ringing sound.

According to an embodiment of the present invention, it is possible, when performing notification to a user by using sound, to more easily and reliably allow the user to recognize the notification sound irrespective of the surrounding environment.

BRIEF DESCRIPTION OF THE DRAWINGS

FIG. 6 is a diagram for explaining weighting factors;

DESCRIPTION OF THE PREFERRED EMBODIMENTS

With reference to the drawings, embodiments according to the present invention will be described below.

First Embodiment

Configuration Example of Mobile Phone

An information processing device according to an embodiment of the present invention performs notification to a user by using sound. With reference to the drawings, description will be made below of an example in which a mobile phone serving as the information processing device notifies a user of an incoming call by using a ringing ringtone.

Figure 1:
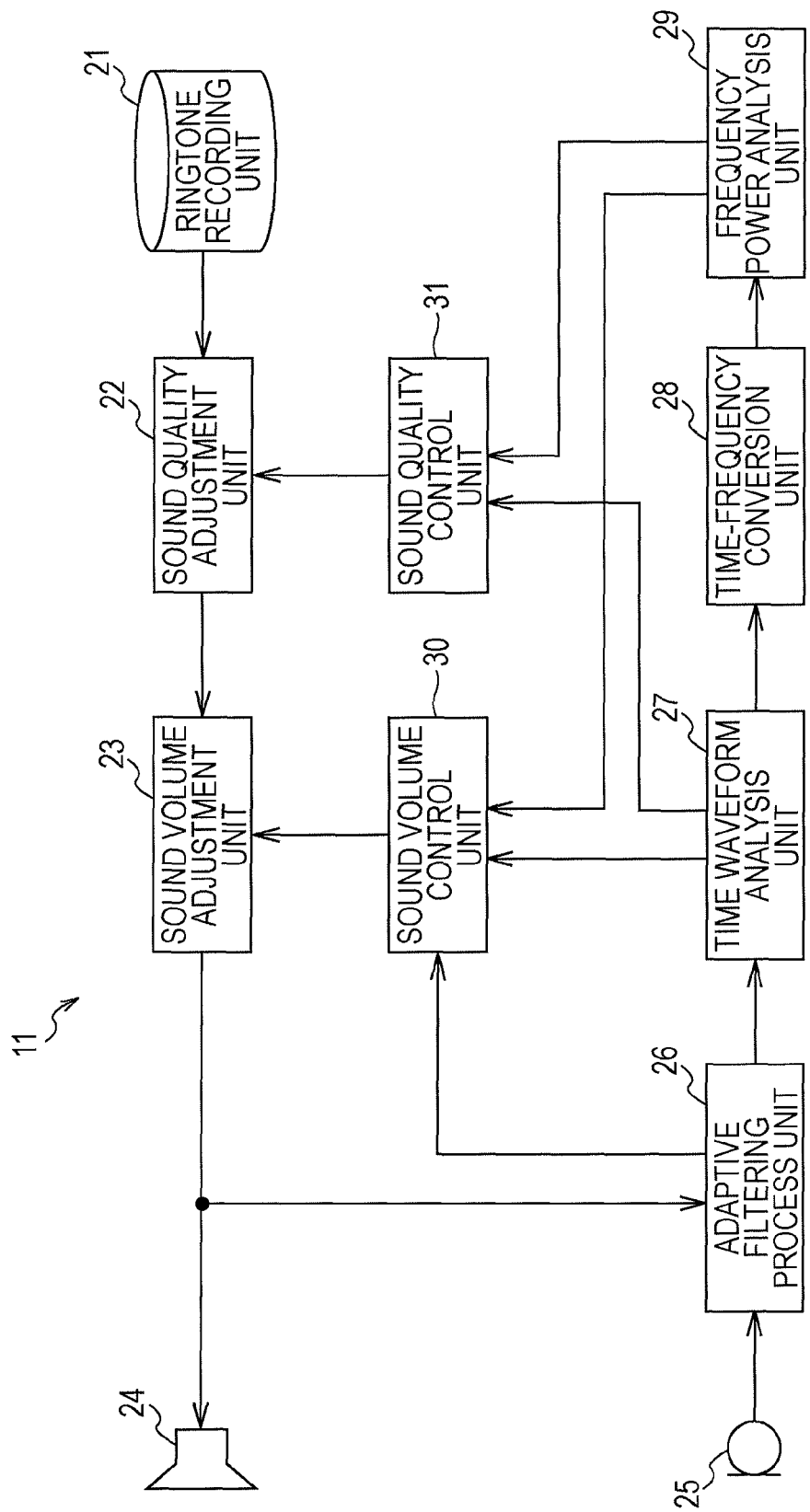
FIG. 1 is a block diagram illustrating a configuration of a mobile phone according to an embodiment of the present invention.

FIG. 1 is a diagram illustrating a configuration example of a mobile phone according to an embodiment of the present invention.

A mobile phone 11 is configured to include a ringtone recording unit 21, a sound quality adjustment unit 22, a sound volume adjustment unit 23, a speaker 24, a microphone 25, an adaptive filtering process unit 26, a time waveform analysis unit 27, a time-frequency conversion unit 28, a frequency power analysis unit 29, a sound volume control unit 30, and a sound quality control unit 31.

The ringtone recording unit 21, which is formed by a nonvolatile memory, for example, records audio data that reproduces a previously prepared ringing ringtone for the time of receipt of an incoming call, and supplies, when necessary, the audio data of the ringing ringtone to the sound quality adjustment unit 22. In accordance with the control of the sound quality control unit 31, the sound quality adjustment unit 22 adjusts the sound quality of the ringing ringtone supplied from the ringtone recording unit 21, and supplies the adjusted ringing ringtone to the sound volume adjustment unit 23. Herein, the adjustment of the sound quality of the ringing ringtone refers to the emphasis or the like of a particular frequency band component of the ringing ringtone.

In accordance with the control of the sound volume control unit 30, the sound volume adjustment unit 23 adjusts the sound volume of the ringing ringtone supplied from the sound quality adjustment unit 22, and supplies the adjusted ringing ringtone to the speaker 24 and the adaptive filtering process unit 26. The speaker 24 reproduces the ringing ringtone supplied from the sound volume adjustment unit 23.

The microphone 25, which is a microphone for telephone conversation with the other party using another mobile phone, picks up the voice of the user during a telephone conversation. The voice of the user picked up during the telephone conversation is transmitted by radio communication to the mobile phone of the other party of the call via a base station or the like.

Further, upon receipt of an incoming call, the microphone 25 picks up the sound around the mobile phone 11 (hereinafter occasionally referred to as the ambient sound), and supplies the audio data of the obtained ambient sound to the adaptive filtering process unit 26. The ambient sound is picked up at the time of receipt of an incoming call. The ambient sound, therefore, includes not only the environmental sound around the mobile phone 11 but also the ringing ringtone output from the speaker 24.

The adaptive filtering process unit 26 performs an adaptive filtering process using the ringing ringtone supplied from the sound volume adjustment unit 23 and the ambient sound supplied from the microphone 25, to thereby extract estimated environmental sound from the ambient sound.

That is, the ambient sound picked up by the microphone 25 includes the environmental sound and the ringing ringtone, and the ringing ringtone changes in accordance with a propagation characteristic from the speaker 24 to the microphone 25 (hereinafter occasionally referred to particularly as the environment propagation characteristic). The adaptive filtering process unit 26, therefore, estimates the environment propagation characteristic to estimate the ringing ringtone picked up by the microphone 25, eliminates (subtracts) the obtained resultant ringing ringtone from the ambient sound to estimate the environmental sound, and determines the result of the estimation as the estimated environmental sound.

The adaptive filtering process unit 26 supplies the time waveform analysis unit 27 with the estimated environmental sound obtained by the adaptive filtering process and the ringing ringtone supplied from the sound volume adjustment unit 23, and supplies the sound volume control unit 30 with a suppression amount of the ambient sound obtained by the adaptive filtering process.

The suppression amount refers to the value representing how much the ambient sound corresponding to the original signal is suppressed by the ringing ringtone in the adaptive filtering process, i.e., the ratio between the ambient sound and the estimated environmental sound. The suppression amount indicates that the smaller the value thereof is, the closer to the volume (sound volume) of the ambient sound the volume of the estimated environmental sound is. In other words, it is assumed that the smaller the suppression amount is, the more easily the ringing ringtone is drowned by the surrounding environmental sound, and the more difficult it is for the user of the mobile phone 11 to hear the ringing ringtone.

The time waveform analysis unit 27 performs time waveform analysis on the ringing ringtone and the estimated environmental sound supplied from the adaptive filtering process unit 26, and extracts, from each of the ringing ringtone and the estimated environmental sound, the feature quantity of a particular feature of the time waveform of the sound (hereinafter referred to as the time waveform feature quantity).

The time waveform analysis unit 27 supplies the respective time waveform feature quantities of the ringing ringtone and the estimated environmental sound to the sound volume control unit 30, and supplies the time waveform feature quantity of the estimated environmental sound to the sound quality control unit 31. The time waveform analysis unit 27 further supplies the ringing ringtone and the estimated environmental sound to the time-frequency conversion unit 28.

The time-frequency conversion unit 28 performs time-frequency conversion on the ringing ringtone and the estimated environmental sound supplied from the time waveform analysis unit 27, to thereby convert each of the sounds from the time waveform into frequency information (frequency component). Then, the time-frequency conversion unit 28 supplies the obtained frequency information to the frequency power analysis unit 29.

The frequency power analysis unit 29 performs power analysis on the frequency information of each of the ringing ringtone and the estimated environmental sound supplied from the time-frequency conversion unit 28, and extracts, from the frequency information, the feature quantity of a predetermined feature of the frequency component of the sound (hereinafter referred to as the frequency feature quantity). The frequency power analysis unit 29 supplies the sound volume control unit 30 with the obtained respective frequency feature quantities of the ringing ringtone and the estimated environmental sound, and supplies the sound quality control unit 31 with the frequency feature quantity of the estimated environmental sound.

On the basis of the suppression amount supplied from the adaptive filtering process unit 26, the time waveform feature quantities supplied from the time waveform analysis unit 27, and the frequency feature quantities supplied from the frequency power analysis unit 29, the sound volume control unit 30 controls the sound volume adjustment unit 23 to adjust the sound volume of the ringing ringtone.

On the basis of the time waveform feature quantity supplied from the time waveform analysis unit 27 and the frequency feature quantity supplied from the frequency power analysis unit 29, the sound quality control unit 31 controls the sound quality adjustment unit 22 to adjust the sound quality of the ringing ringtone.

Configuration Example of Sound Volume Control Unit

Figure 2:
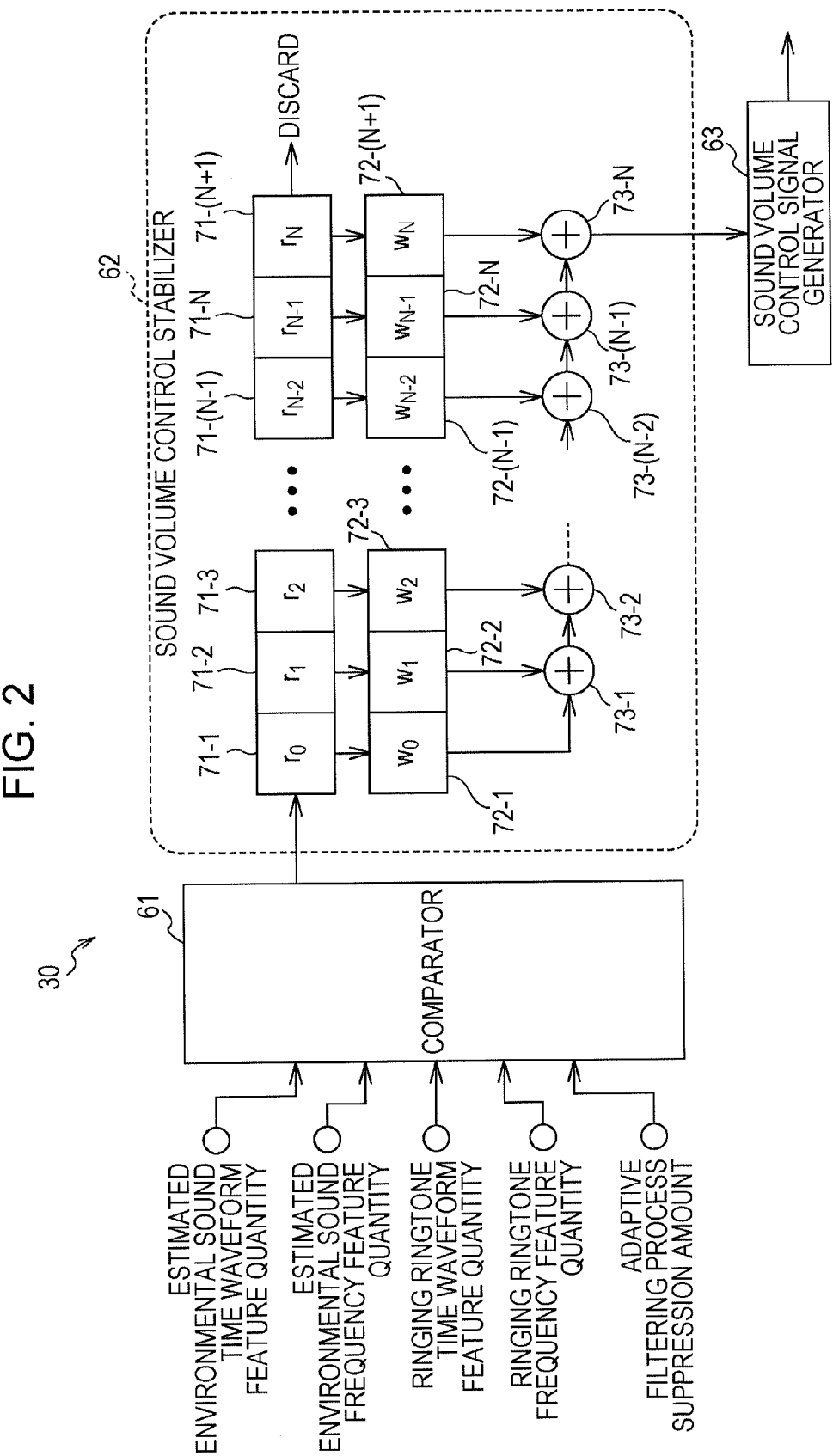
FIG. 2 is a diagram illustrating a configuration example of a sound volume control unit.
Figure 3:
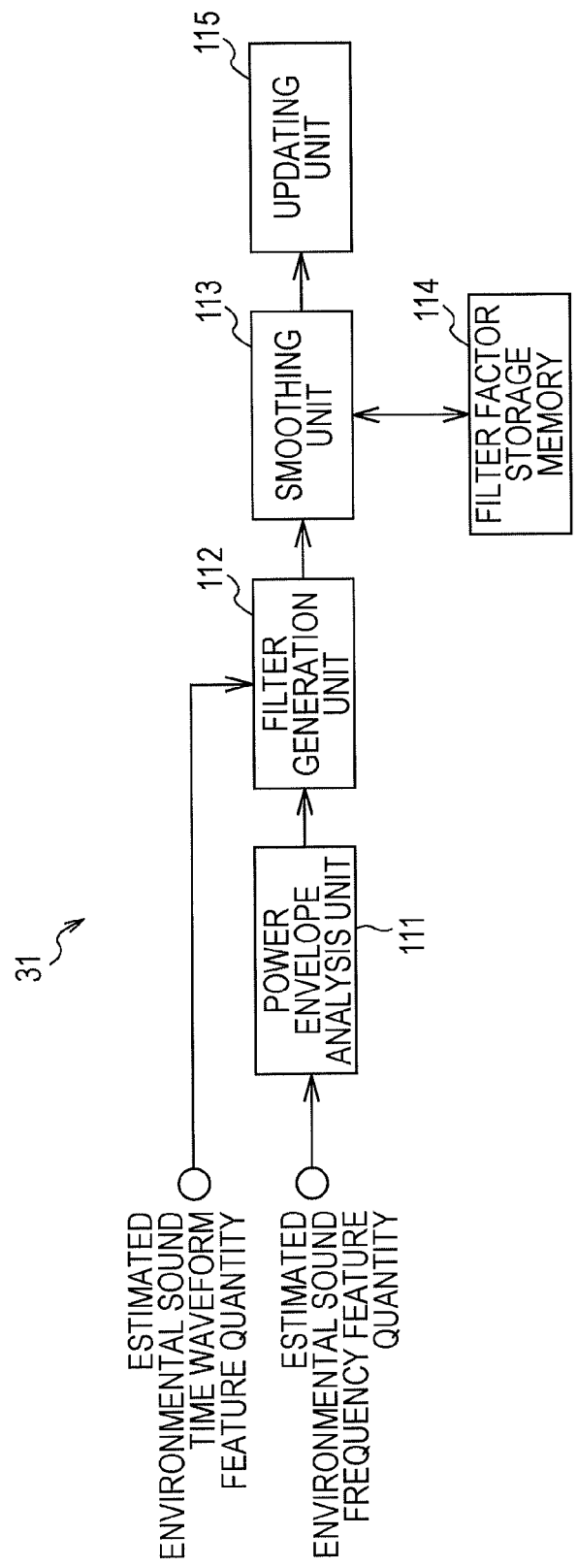
FIG. 3 is a diagram illustrating a configuration example of a sound quality control unit.

More specifically, the sound volume control unit 30 and the sound quality control unit 31 of FIG. 1 are configured as illustrated in FIGS. 2 and 3, respectively.

FIG. 2 is a diagram illustrating a more detailed configuration example of the sound volume control unit 30.

The sound volume control unit 30 is configured to include a comparator 61, a sound volume control stabilizer 62, and a sound volume control signal generator 63. Further, the comparator 61 receives the suppression amount supplied from the adaptive filtering process unit 26, the respective time waveform feature quantities of the ringing ringtone and the estimated environmental sound supplied from the time waveform analysis unit 27, and the respective frequency feature quantities of the ringing ringtone and the estimated environmental sound supplied from the frequency power analysis unit 29.

The comparator 61 performs comparisons between the supplied suppression amount and a threshold value, between the respective time waveform feature quantities of the ringing ringtone and the estimated environmental sound, and between the respective frequency feature quantities of the ringing ringtone and the estimated environmental sound, and supplies the results of the comparisons to the sound volume control stabilizer 62. That is, whether or not the sound volume of the ringing ringtone is appropriate with respect to the environmental sound is determined on the basis of the above comparisons. Then, one of numerical values "−1," "0," and "1" is output as a comparison result, wherein "−1" represents a comparison result indicating high sound volume of the ringing ringtone, "0" represents a comparison result indicating appropriate sound volume of the ringing ringtone, and "1" represents a comparison result indicating low sound volume of the ringing ringtone.

The sound volume control stabilizer 62 performs weighted addition using a weighting factor w on the comparison results at respective times continuously supplied from the comparator 61 during a predetermined period. Thereby, the sound volume control stabilizer 62 smoothes the comparison results, and supplies the resultant comparison results to the sound volume control signal generator 63.

The sound volume control stabilizer 62 includes comparison result holding units 71-1 to 71-(N+1), factor holding units 72-1 to 72-(N+1), and addition units 73-1 to 73-N.

The comparison result holding unit 71-1 holds a comparison result $r_0$ supplied from the comparator 61. If another comparison result is newly supplied from the comparator 61, the comparison result holding unit 71-1 supplies the hitherto held comparison result $r_0$ to the comparison result holding unit 71-2 and the factor holding unit 72-1, and holds the newly supplied comparison result as the comparison result $r_0$.

A comparison result holding unit 71-$n$ (wherein 2≤n≤N) holds a comparison result $r_{n-2}$ supplied from a comparison result holding unit 71-($n$−1) as a comparison result $r_{n-1}$. If another comparison result is newly supplied from the comparison result holding unit 71-($n-1$), the comparison result holding unit 71-$n$ supplies the hitherto held comparison result $r_{n-1}$ to a comparison result holding unit 71-($n+1$) and the factor holding unit 72-$n$, and holds the newly supplied comparison result.

Further, the comparison result holding unit 71-(N+1) holds a comparison result $r_{N-1}$ supplied from a comparison result holding unit 71-N as a comparison result $r_N$. If another comparison result is newly supplied from the comparison result holding unit 71-N, the comparison result holding unit 71-(N+1) supplies the hitherto held comparison result $r_N$ to the factor holding unit 72-(N+1), and thereafter discards the comparison result $r_N$ and holds the newly supplied comparison result.

The factor holding units 72-1 to 72-(N+1) respectively multiply the comparison results $r_0$ to $r_N$ supplied from the comparison result holding units 71-1 to 71-(N+1) by previously held weighting factors $w_0$ to $w_N$. The factor holding unit 72-1 supplies the addition unit 73-1 with the comparison result multiplied by the corresponding weighting factor, and the factor holding units 72-2 to 72-(N+1) respectively supply the addition units 73-1 to 73-N with the comparison results multiplied by the respective weighting factors.

The addition unit 73-1 adds up the respective comparison results supplied from the factor holding units 72-1 and 72-2, and supplies the sum to the addition unit 73-2. Similarly, each of the addition units 73-2 to 73-(N−1) adds up the comparison result supplied from the corresponding one of the addition units 73-1 to 73-(N−2) and the comparison result supplied from the corresponding one of the factor holding units 72-3 to 72-N, and supplies the sum to the corresponding one of the addition units 73-3 to 73-N. Further, the addition unit 73-N adds up the comparison result from the addition unit 73-(N−1) and the comparison result from the factor holding unit 72-(N+1), and supplies the sum to the sound volume control signal generator 63.

In accordance with the comparison result supplied from the addition unit 73-N, i.e., the comparison result smoothed by the weighted addition, the sound volume control signal generator 63 generates a sound volume control signal for increasing or reducing the sound volume of the ringing ringtone, and supplies the sound volume control signal to the sound volume adjustment unit 23.

In the following, the comparison result holding units 71-1 to 71-(N+1) will be simply referred to as the comparison result holding units 71, where distinction therebetween is unnecessary. Further, the factor holding units 72-1 to 72-(N+1) will be simply referred to as the factor holding units 72, where distinction therebetween is unnecessary. Furthermore, the addition units 73-1 to 73-N will be simply referred to as the addition units 73, where distinction therebetween is unnecessary.

Configuration Example of Sound Quality Control Unit

FIG. 3 is a diagram illustrating a more detailed configuration example of the sound quality control unit 31.

The sound quality control unit 31 is configured to include a power envelope analysis unit 111, a filter generation unit 112, a smoothing unit 113, a filter factor storage memory 114, and an updating unit 115. Further, the power envelope analysis unit 111 receives the frequency feature quantity of the estimated environmental sound supplied from the frequency power analysis unit 29, and the filter generation unit 112 receives the time waveform feature quantity of the estimated environmental sound supplied from the time waveform analysis unit 27.

The power envelope analysis unit 111 performs power envelope analysis on the supplied frequency feature quantity of the estimated environmental sound to obtain the rough shape of the power envelope, and supplies the filter generation unit 112 with rough shape information representing the rough shape.

With the use of the rough shape information supplied from the power envelope analysis unit 111, the filter generation unit 112 generates a filter factor for adjusting the sound quality of the ringing ringtone, corrects the filter factor on the basis of the time waveform feature quantity of the estimated environmental sound, and supplies the corrected filter factor to the smoothing unit 113.

The smoothing unit 113 smoothes the filter factor supplied from the filter generation unit 112. That is, the smoothing unit 113 smoothes the filter factor by using the filter factor supplied from the filter generation unit 112 and the past filter factor stored in the filter factor storage memory 114, and supplies the smoothed filter factor to the filter factor storage memory 114 and the updating unit 115.

The filter factor storage memory 114 holds the filter factor supplied from the smoothing unit 113, and supplies, when necessary, the filter factor to the smoothing unit 113. The updating unit 115 holds the filter factor for sound quality adjustment supplied from the smoothing unit 113, and supplies the filter factor to the sound quality adjustment unit 22 to cause the sound quality adjustment unit 22 to perform the sound quality adjustment.

The number of past filter factors stored in the filter factor storage memory 114 and used in the smoothing process may be any number. For easier description, it is assumed in the following that only the filter factor generated immediately before the filter factor to be processed is stored in the filter factor storage memory 114 and used in the smoothing process.

Ringing Process

Meanwhile, when the mobile phone 11 receives an incoming call from another mobile phone, the mobile phone 11 performs a ringing process to output the ringing ringtone and notify the user of the incoming call. With reference to the flowchart of FIG. 4, the ringing process by the mobile phone 11 will be described below.

At Step S11, the sound quality adjustment unit 22 reads from the ringtone recording unit 21 the ringing ringtone previously set by the user.

At Step S12, the sound quality adjustment unit 22 performs a filtering process on the read ringing ringtone by using the filter factor supplied from the updating unit 115 of the sound quality control unit 31, to thereby perform sound quality adjustment of the ringing ringtone. That is, the sound quality adjustment is performed with the audio data of the ringing ringtone multiplied by the fitter factor. The ringing ringtone subjected to the sound quality adjustment is supplied from the sound quality adjustment unit 22 to the sound volume adjustment unit 23.

At Step S13, on the basis of the sound volume control signal supplied from the sound volume control signal generator 63 of the sound volume control unit 30, the sound volume adjustment unit 23 performs sound volume adjustment of the ringing ringtone supplied from the sound quality adjustment unit 22.

For example, in accordance with the sound volume control signal, the ringing ringtone is output with the audio data thereof processed such that the sound volume of the ringing ringtone is increased or reduced, or the ringing ringtone is directly output with no process performed thereon. The sound volume adjustment unit 23 supplies the speaker 24 and the adaptive filtering process unit 26 with the ringing ringtone subjected to the sound volume adjustment.

Immediately after the receipt of an incoming call, i.e., at the start of ringing of the ringing ringtone, the sound quality adjustment or the sound volume adjustment is performed in accordance with the initial setting. For example, according to the initial setting, the sound quality adjustment is not performed while the sound volume adjustment is performed to minimize the sound volume. Further, the initial setting may be set at the time of design of the mobile phone 11, or may be set by the user.

At Step S14, the speaker 24 reproduces the ringing ringtone supplied from the sound volume adjustment unit 23. Thereby, the ringing ringtone rings, and the incoming call notification to the user starts.

At Step S15, the microphone 25 picks up and supplies the ambient sound to the adaptive filtering process unit 26. That is, the ambient sound is picked up and converted into the audio data. The ambient sound includes the environmental sound, which is the sound of the environment around the mobile phone 11, and the ringing ringtone output from the mobile phone 11.

At Step S16, the adaptive filtering process unit 26 performs the adaptive filtering process by using the ringing ringtone supplied from the sound volume adjustment unit 23 and the ambient sound supplied from the microphone 25.

Specifically, the adaptive filtering process unit 26 performs the filtering process on the ringing ringtone by using the estimation result of the environment propagation characteristic (hereinafter referred to as the estimated propagation characteristic) from the speaker 24 to the microphone 25 obtained by the last adaptive filtering process.

That is, the estimated propagation characteristic serves as the filter factor for a filter for obtaining the ringing ringtone picked up by the microphone 25 from the ringing ringtone ringing from the speaker 24, and the ringing ringtone picked up by the microphone 25 is estimated by the filtering process using the filter factor. Further, the ringing ringtone obtained by the estimation is subtracted from the ambient sound, and the obtained resultant sound is determined as the estimated environmental sound.

The adaptive filtering process unit 26 extracts the estimated environmental sound from the ambient sound, and supplies the time waveform analysis unit 27 with the estimated environmental sound and the ringing ringtone supplied from the sound volume adjustment unit 23. Further, the adaptive filtering process unit 26 calculates the suppression amount by calculating the ratio between the ambient sound and the estimated environmental sound and taking the logarithm of the ratio, and supplies the suppression amount to the comparator 61 of the sound volume control unit 30. Further, with the use of the estimated environmental sound obtained by the present adaptive filtering process, the adaptive filtering process unit 26 updates the filter factor corresponding to the estimated propagation characteristic.

For example, a method using an LMS (Least Mean Square) filter may be employed for the adaptive filtering process. With the adaptive filtering process thus performed, it is possible to estimate the environment propagation characteristic with higher accuracy, and consequently to estimate the environmental sound with higher accuracy. Particularly, according to the adaptive filtering process, the estimated propagation characteristic is updated by the feedback of the result of the process every time the process is performed. Even if the surrounding environment changes, therefore, it is possible to highly accurately estimate the environmental sound with a simple process.

Further, with the adaptive filtering process, it is possible to obtain the information of the signal energy suppressed by the adaptive filtering process, i.e., the suppression amount of the ambient sound, and to know whether or not the ringing ringtone is sufficiently audible to the user.

At Step S17, the time waveform analysis unit 27 performs time waveform analysis on the ringing ringtone and the estimated environmental sound supplied from the adaptive filtering process unit 26, and extracts the time waveform feature quantity from each of the sounds.

For example, the RMS (Root Mean Square) obtained by calculating the mean square of the time waveform (amplitude) of the ringing ringtone and taking the square root of the obtained mean square, the mean or variance of the ringing ringtone, or the like is calculated as the time waveform feature quantity. Similarly, the RMS, the mean, the variance, or the like is calculated as the time waveform feature quantity of the estimated environmental sound.

The time waveform analysis unit 27 supplies the obtained respective time waveform feature quantities of the ringing ringtone and the estimated environmental sound to the comparator 61 of the sound volume control unit 30, and supplies the time waveform feature quantity of the estimated environmental sound to the filter generation unit 112 of the sound quality control unit 31. Further, the time waveform analysis unit 27 supplies the ringing ringtone and the estimated environmental sound to the time-frequency conversion unit 28.

At Step S18, the time-frequency conversion unit 28 performs time-frequency conversion on the ringing ringtone and the estimated environmental sound supplied from the time waveform analysis unit 27. For example, Fourier transform or octave band analysis is performed as the time-frequency conversion. The time-frequency conversion unit 28 obtains the frequency information of each of the ringing ringtone and the estimated environmental sound through the time-frequency conversion, and supplies the frequency information to the frequency power analysis unit 29.

At Step S19, the frequency power analysis unit 29 performs power analysis on the frequency information of each of the ringing ringtone and the estimated environmental sound supplied from the time-frequency conversion unit 28, and extracts the frequency feature quantity.

For example, the peak power of the frequency power envelope or the frequency information, or the information representing a frequency band corresponding to high frequency power of the ringing ringtone or the estimated environmental sound is obtained as the frequency feature quantity of each of the ringing ringtone and the estimated environmental sound. Herein, the frequency band corresponding to high frequency power is, for example, a continuous band including a frequency corresponding to the highest frequency power represented by the frequency information and a frequency, the difference in frequency power of which from the above frequency is equal to or smaller than a predetermined threshold value.

The frequency power analysis unit 29 supplies the respective frequency feature quantities of the ringing ringtone and the estimated environmental sound to the comparator 61 of the sound volume control unit 30, and supplies the frequency feature quantity of the estimated environmental sound to the power envelope analysis unit 111 of the sound quality control unit 31.

At Step S20, the sound volume control unit 30 performs the sound volume control process by using the suppression amount supplied from the adaptive filtering process unit 26, the time waveform feature quantities supplied from the time waveform analysis unit 27, and the frequency feature quantities supplied from the frequency power analysis unit 29, and supplies the sound volume control signal to the sound volume adjustment unit 23.

Due to the sound volume control signal, the sound volume adjustment is performed in accordance with the surrounding environment to make it easier for the user to catch the ringing ringtone. For example, the adjustment is performed to increase the sound volume if the surrounding environment is noisy, and to reduce the sound volume if the surrounding environment is quiet.

At Step S21, the sound quality control unit 31 performs the sound quality control process by using the time waveform feature quantity supplied from the time waveform analysis unit 27 and the frequency feature quantity supplied from the frequency power analysis unit 29, and supplies the filter factor for sound quality adjustment to the sound quality adjustment unit 22.

Due to the filtering process using the filter factor, the sound quality adjustment is performed in accordance with the surrounding environment to make it easier for the user to catch the ringing ringtone. For example, the sound quality adjustment (equalization) of the ringing ringtone is performed to emphasize a frequency band one octave higher than a high-power frequency band of the estimated environmental sound. Thereby, the low-power frequency band of the environmental sound is emphasized in the ringing ringtone, and it becomes easier for the user to catch the ringing ringtone.

The sound volume control process of Step S20 and the sound quality control process of Step S21 will be described in detail later.

At Step S22, the mobile phone 11 determines whether or not to stop the ringing of the ringing ringtone. For example, if the user operates the mobile phone 11 and instructs the response to the incoming call, i.e., the start of the session of the call, or if the ringing ringtone continues ringing for a predetermined time or longer, it is determined that the ringing should be stopped.

If it is determined at Step S22 not to stop the ringing, the procedure returns to Step S11, and the above-described processes are repeated. That is, the sound volume and the sound quality of the ringing ringtone are adjusted in accordance with the surrounding environment, and the ringing ringtone rings.

Meanwhile, if it is determined at Step S22 to stop the ringing, the ringing of the ringing ringtone is stopped, and the ringing process is completed. Upon completion of the ringing process, a process of allowing the user to talk to the other party starts, or a transfer process to a server for performing a call answering service is performed, for example.

In the above-described manner, the mobile phone 11 extracts the estimated environmental sound from the picked-up ambient sound through the adaptive filtering process, and performs the adjustment of the sound volume or the sound quality of the ringing ringtone on the basis of the respective feature quantities of the estimated environmental sound and the ringing ringtone. With the adaptive filtering process thus performed, it is possible to estimate the environmental sound with more ease and accuracy, and to obtain the estimated environmental sound. Further, with appropriate sound volume adjustment or sound quality adjustment performed in accordance with the surrounding environment on the basis of the respective feature quantities of the estimated environmental sound and the ringing ringtone, it is possible to ring the ringing ringtone in a manner more easily audible to the user, irrespective of the environment around the mobile phone 11. Accordingly, the user can easily recognize the ringing ringtone under any environment.

Further, if the environment around the mobile phone 11 changes, the sound volume or the sound quality of the ringing ringtone is adjusted in accordance with the change. It is therefore unnecessary for the user to reset the ring pattern or perform a special operation every time the change occurs. Further, the sound volume or the sound quality of the ringing ringtone is adjusted in accordance with the surrounding environment. The mobile phone 11, therefore, is capable of allowing the user to more easily notice an incoming call without causing nuisance to nearby people than in a case in which the sound volume is simply increased by a certain degree.

Further, the mobile phone 11 is configured to pick up the ambient sound by using the microphone 25 for telephone conversation. Thus, the device configuration of an existing mobile phone can be directly used, and it is unnecessary to provide a special device.

In the above, the description has been made of an example in which the sound volume or the sound quality of the ringing ringtone is continuously and constantly adjusted. However, the adjustment of the sound volume or the sound quality may be intermittently performed. Further, only one of the sound volume and the sound quality may be adjusted.

Further, in the above description, the sound volume and the sound quality are separately adjusted. However, the sound volume and the sound quality may be adjusted at the same time. Further, in the above description, the sound volume is adjusted after the adjustment of the sound quality. However, the sound quality may be adjusted after the adjustment of the sound volume.

Sound Volume Control Process

Figure 4:
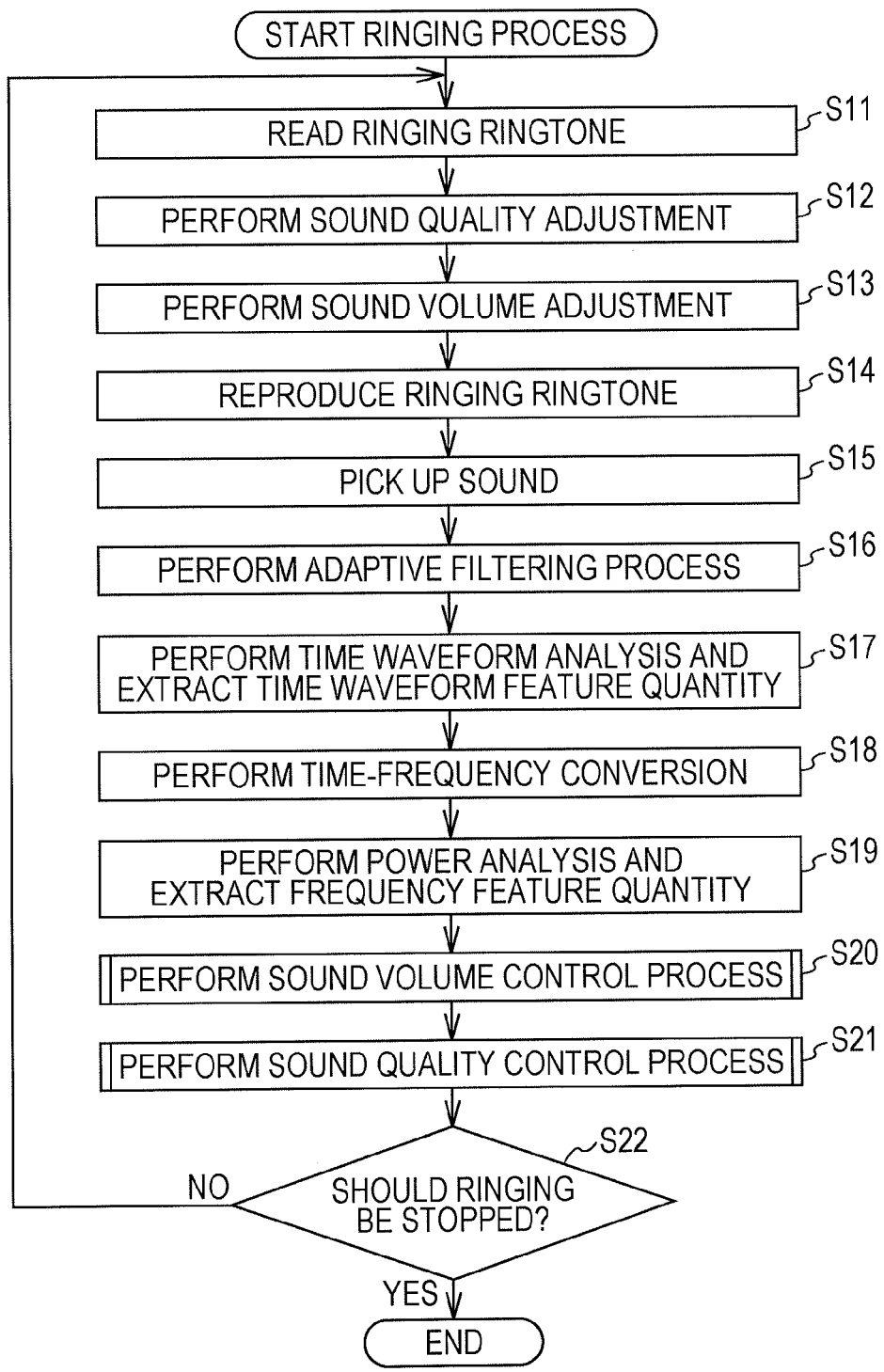
FIG. 4 is a flowchart for explaining a ringing process.

Subsequently, with reference to the flowchart of FIG. 5, description will be made of the sound volume control process corresponding to the process of Step S20 in FIG. 4.

At Step S51, the comparator 61 compares the suppression amount supplied from the adaptive filtering process unit 26 with a preset threshold value ths to determine whether or not the suppression amount is equal to or smaller than the threshold value ths. Herein, the threshold value ths is preset at the time of, for example, design of the mobile phone 11.

If it is determined at Step S51 that the suppression amount is equal to or smaller than the threshold value ths, the comparator 61 at Step S52 outputs to the comparison result holding unit 71-1 the numerical value "1" representing the comparison result indicating low sound volume of the ringing ringtone.

If the suppression amount is relatively small, the ringing ringtone is drowned by the environmental sound, and it is difficult for the user to hear the ringing ringtone. If the suppression amount is equal to or smaller than the threshold value ths, therefore, the comparator 61 outputs the comparison result indicating low sound volume so as to adjust the sound volume of the ringing ringtone to a higher value. After the output of the comparison result, the procedure proceeds from Step S52 to Step S59.

Further, if it is determined at Step S51 that the suppression amount exceeds the threshold value ths, the comparator 61 at Step S53 calculates the difference Dt between the time waveform feature quantity of the ringing ringtone and the time waveform feature quantity of the estimated environmental sound supplied from the time waveform analysis unit 27.

More specifically, the comparator 61 subtracts, from the time waveform feature quantity of the ringing ringtone, the previously calculated amount of attenuation of the ringing ringtone occurring between the speaker 24 and the microphone 25, and further subtracts the obtained resultant value from the time waveform feature quantity of the estimated environmental sound. Thereby, the difference Dt is calculated.

At Step S54, the comparator 61 calculates the difference Df between the frequency feature quantity of the ringing ringtone and the frequency feature quantity of the estimated environmental sound supplied from the frequency power analysis unit 29. More specifically, the comparator 61 subtracts the amount of attenuation of the ringing ringtone occurring between the speaker 24 and the microphone 25 from the frequency feature quantity of the ringing ringtone, and further subtracts, from the obtained resultant value, the frequency feature quantity of the estimated environmental sound. Thereby, the difference Df is calculated.

At Step S55, the comparator 61 determines whether or not the difference Dt or Df is equal to or smaller than a preset threshold value.

Specifically, the difference Dt in the time waveform feature quantity and a threshold value th(t0) set for the time waveform feature quantity are compared with each other, and the difference Df in the frequency feature quantity and a threshold value th(f0) set for the frequency feature quantity are similarly compared with each other. Then, if the difference Dt is larger than the threshold value th(t0) and the difference Df is larger than the threshold value th(f0), it is determined at Step S55 that the difference is larger than the threshold value. Further, if any of the differences Dt and Df is equal to or smaller than the corresponding one of the threshold values th(t0) and th(f0), it is determined at Step S55 that the difference is equal to or smaller than the threshold value.

If it is determined at Step S55 that the difference is equal to or smaller than the threshold value, the procedure proceeds to Step S52, and the numerical value "1" representing the comparison result indicating low sound volume is output. Thereafter, the procedure proceeds from Step S52 to Step S59.

For example, if the time waveform feature quantity is represented by the RMS, the time waveform feature quantity represents an average magnitude of the amplitude of the time waveform of a sound. Therefore, if the difference Dt in the time waveform feature quantity is relatively small, i.e., if the difference Dt is equal to or smaller than the threshold value th(t0), the sound volume of the ringing ringtone is supposed to be low as compared with the sound volume of the estimated environmental sound. In this case, therefore, the sound volume of the ringing ringtone should be increased. Therefore, the comparison result indicating low sound volume is output.

Further, if the frequency feature quantity is represented by the peak power of the frequency information, for example, the frequency feature quantity represents the maximum value among the power values of the respective frequency components of a sound. Therefore, if the difference Df in the frequency feature quantity is relatively small, i.e., if the difference Df is equal to or smaller than the threshold value th(f0), the sound volume of the ringing ringtone is supposed to be low as compared with the sound volume of the estimated environmental sound. Also in this case, therefore, the sound volume of the ringing ringtone should be increased. Therefore, the comparison result indicating low sound volume is output.

Meanwhile, if it is determined at Step S55 that the difference is larger than the threshold value, the comparator 61 at Step S56 determines whether or not the difference Dt or Df is equal to or larger than a preset threshold value.

Specifically, the difference Dt in the time waveform feature quantity and a threshold value th(t1) set for the time waveform feature quantity are compared with each other, and the difference Df in the frequency feature quantity and a threshold value th(f1) set for the frequency feature quantity are similarly compared with each other. The threshold values th(t1) and th(f1) are larger than the threshold values th(t0) and th(f0), respectively.

Then, if any of the differences Dt and Df is equal to or larger than the corresponding one of the threshold values th(t1) and th(f1), it is determined at Step S56 that the difference is equal to or larger than the threshold value.

If it is determined at Step S56 that the difference is equal to or larger than the threshold value, the comparator 61 at Step S57 outputs to the comparison result holding unit 71-1 the numerical value "−1" representing the comparison result indicating high sound volume of the ringing ringtone.

For example, if the difference Dt in the time waveform feature quantity is relatively large, i.e., if the difference Dt is equal to or larger than the threshold value th(t1), the sound volume of the ringing ringtone is supposed to be excessively high as compared with the sound volume of the estimated environmental sound. Further, if the difference Df in the frequency feature quantity is relatively large, i.e., if the difference Df is equal to or larger than the threshold value th(f1), the sound volume of the ringing ringtone is also supposed to be excessively high as compared with the sound volume of the estimated environmental sound.

In such a case, the user is supposed to hear the ringing ringtone at substantially high sound volume, and the sound volume of the ringing ringtone should be reduced. Therefore, the comparison result indicating high sound volume is output, and the procedure proceeds to Step S59.

Meanwhile, if it is determined at Step S56 that the difference is smaller than the threshold value, the comparator 61 at Step S58 outputs to the comparison result holding unit 71-1 the numerical value "0" representing the comparison result indicating appropriate sound volume of the ringing ringtone.

For example, if the difference Dt in the time waveform feature quantity is a value larger than the threshold value th(t0) and smaller than the threshold value th(t1) and the difference Df in the frequency feature quantity is a value larger than the threshold value th(f0) and smaller than the threshold value th(f1), the user is supposed to hear the ringing ringtone at appropriate sound volume. In this case, the sound volume adjustment is not particularly necessary. Therefore, the comparison result indicating appropriate sound volume is output, and the procedure proceeds to Step S59.

After the output of the comparison result from the comparator 61 at Step S52, S57, or S58, the sound volume control stabilizer 62 at Step S59 smoothes the comparison result supplied from the comparator 61, and supplies the smoothed comparison result to the sound volume control signal generator 63.

Specifically, the sound volume control stabilizer 62 multiplies the (N+1) number of the latest comparison results $r_0$ to $r_N$, which include the comparison result $r_0$ at the present time, by the weighting factors $w_0$ to $w_N$, respectively, and calculates the sum of the comparison results multiplied by the weighting factors, to thereby smooth the comparison results. That is, the comparison results held by the comparison result holding units 71 are multiplied by the weighting factors held by the factor holding units 72, and the sum of the comparison results multiplied by the weighting factors is calculated by the addition units 73.

For example, the weighting factors multiplied to the comparison results may be set such that a smaller weighting factor is multiplied to an earlier comparison result, or that the weighting factors have the same value. With the comparison results thus smoothed by the weighted addition using the weighting factors, it is possible to suppress the reaction to an instantaneous change in the environmental sound, and to more appropriately perform the sound volume control.

At Step S60, the sound volume control signal generator 63 compares the smoothed comparison result supplied from the sound volume control stabilizer 62 with each of preset threshold values thv0 and thv1. Herein, the threshold value thv0 is smaller than the threshold value thv1.

At Step S61, the sound volume control signal generator 63 generates the sound volume control signal in accordance with the result of the comparison between the smoothed comparison result and each of the threshold values, and supplies the sound volume control signal to the sound volume adjustment unit 23.

For example, if the smoothed comparison result is equal to or larger than the threshold value thv1, it is assumed that the numerical value "1" representing the comparison result indicating low sound volume is included in many of the comparison results at the respective times in a predetermined period used for the smoothing process. In this case, the sound volume of the ringing ringtone is supposed to be low as compared with the sound volume of the environmental sound. Therefore, the sound volume control signal generator 63 generates and outputs a sound volume control signal for increasing the sound volume of the ringing ringtone by one step.

In the generation of the sound volume control signal for increasing the sound volume, the range of increase in sound volume of the ringing ringtone may be changed, e.g., the sound volume may be increased in a few steps in accordance with the value of the suppression amount.

Further, if the smoothed comparison result is equal to or smaller than the threshold value thv0, it is assumed that the numerical value "−1" representing the comparison result indicating high sound volume is included in many of the comparison results at the respective times in a predetermined period used for the smoothing process. In this case, the sound volume of the ringing ringtone is supposed to be high as compared with the sound volume of the environmental sound. Therefore, the sound volume control signal generator 63 generates and outputs a sound volume control signal for reducing the sound volume of the ringing ringtone by one step.

Furthermore, if the smoothed comparison result is larger than the threshold value thv0 and smaller than the threshold value thv1, the numerical value "0" representing the comparison result indicating appropriate sound volume is included in many of the comparison results used for the smoothing process, and the sound volume adjustment is not particularly necessary. In this case, therefore, a sound volume control signal is not particularly generated.

In the generation of the sound volume control signal, it is possible to more appropriately perform the sound volume control, if the weighting factor according to the reaction sensitivity to the change in the environmental sound is previously set.

For example, to increase the sound volume of the ringing ringtone, the weighting factor $w_n$ according to the reaction sensitivity may be prepared, as illustrated in FIG. 6. FIG. 6 illustrates the comparison results held by the comparison result holding units 71, the weighting factors for respective reaction sensitivities, the values of the smoothed comparison results, and the contents of the sound volume control signal.

That is, the fields of the column "SOUND VOLUME CONTROL STABILIZER INTERNAL MEMORY STATE" described in the top row in the drawing present the comparison results held by the comparison result holding units 71. Herein, "1," "0.8," "0.2," and "−0.1" are presented as the latest four comparison results $r_0$ to $r_3$. The comparison result at the latest time is "1," and the comparison result at the earliest time is "−0.1." In this example, each of the latest three comparison results is larger than 0. Thus, the sound volume of the ringing ringtone is low as compared with the sound volume of the estimated environmental sound.

In the above description, the comparison result is represented by one of the numerical values "1," "0," and "−1." For easier description, the comparison results in FIG. 6 are represented by numerical values between −1 and 1. To obtain such comparison results, threshold processing may be performed in the comparator 61 with the use of threshold values, the number of which corresponds to the number of numerical values representing the comparison results.

Further, the fields of the rows "WEIGHTING FACTOR A," "WEIGHTING FACTOR B," and "WEIGHTING FACTOR C" corresponding to the column "SOUND VOLUME CONTROL STABILIZER INTERNAL MEMORY STATE" present weighting factors $w_0$ to $w_3$ multiplied to the comparison results $r_0$ to $r_3$, respectively.

For example, the weighting factor A is a factor for reaction sensitivity higher than a standard level, wherein the weighting factors $w_0$ to $w_3$ are represented as "0.7," "0.2," "0.1," and "0.0," respectively. In the weighting factor A, the weighting factor $w_0$ multiplied to the comparison result at the present time is a large value of "0.7," and the value of the weighting factor is reduced toward the past. Therefore, the reaction sensitivity to the environmental sound is increased.

If the respective comparison results are multiplied by these weighting factors and smoothed, a numerical value "0.870" representing the smoothed comparison result is obtained, as described in the field of the row "WEIGHTING FACTOR A" corresponding to the column "SOUND VOLUME CONTROL STABILIZATION RESULT." Then, the comparison result is compared with the threshold value thv1, and the sound volume control signal described in the field of the row "WEIGHTING FACTOR A" corresponding to the column "SOUND VOLUME CONTROL SIGNAL GENERATOR OPERATION" is generated.

Herein, the threshold value thv1 is set to "0.4," and the smoothed comparison result "0.870" obtained by the use of the weighting factor A is larger than "0.4" serving as the threshold value thv1. Thus, the sound volume control signal for increasing the sound volume of the ringing ringtone is generated.

Further, for example, the weighting factor B is a factor for reaction sensitivity at the standard level, and the weighting factors $w_0$ to $w_3$ are all represented as "0.25." In the weighting factor B, the weighting factors multiplied to the respective comparison results have the same value.

If the respective comparison results are multiplied by these weighting factors and smoothed, a numerical value "0.475" representing the smoothed comparison result is obtained, as described in the field of the row "WEIGHTING FACTOR B" corresponding to the column "SOUND VOLUME CONTROL STABILIZATION RESULT." Then, the comparison result is compared with the numerical value 0.4 serving as the threshold value thv1, and the sound volume control signal described in the field of the row "WEIGHTING FACTOR B" corresponding to the column "SOUND VOLUME CONTROL SIGNAL GENERATOR OPERATION" is generated.

That is, if the weighting factor B is used, the smoothed comparison result "0.475" is larger than "0.4" serving as the threshold value thv1. Thus, the sound volume control signal for increasing the sound volume of the ringing ringtone is generated.

Further, the weighting factor C is a factor for reaction sensitivity lower than the standard level, and the weighting factors $w_0$ to $w_3$ are represented as "0.15," "0.2," "0.3," and "0.35," respectively. According to the weighting factor C, the comparison result at an earlier time is multiplied by a larger weighting factor.

If the respective comparison results are multiplied by these weighting factors and smoothed, a numerical value "0.335" representing the smoothed comparison result is obtained, as described in the field of the row "WEIGHTING FACTOR C" corresponding to the column "SOUND VOLUME CONTROL STABILIZATION RESULT." Then, the comparison result is compared with the threshold value thv1, and the sound volume control signal described in the field of the row "WEIGHTING FACTOR C" corresponding to the column "SOUND VOLUME CONTROL SIGNAL GENERATOR OPERATION" is generated.

That is, if the weighting factor C is used, the smoothed comparison result "0.335" is smaller than "0.4" serving as the threshold value thv1. Thus, it is not particularly necessary to adjust the sound volume of the ringing ringtone, and the sound volume control signal is not generated.

As described above, with the use of the weighting factor according to the reaction sensitivity to the change in the environmental sound, it is possible to more appropriately perform the sound volume control.

Figure 5:
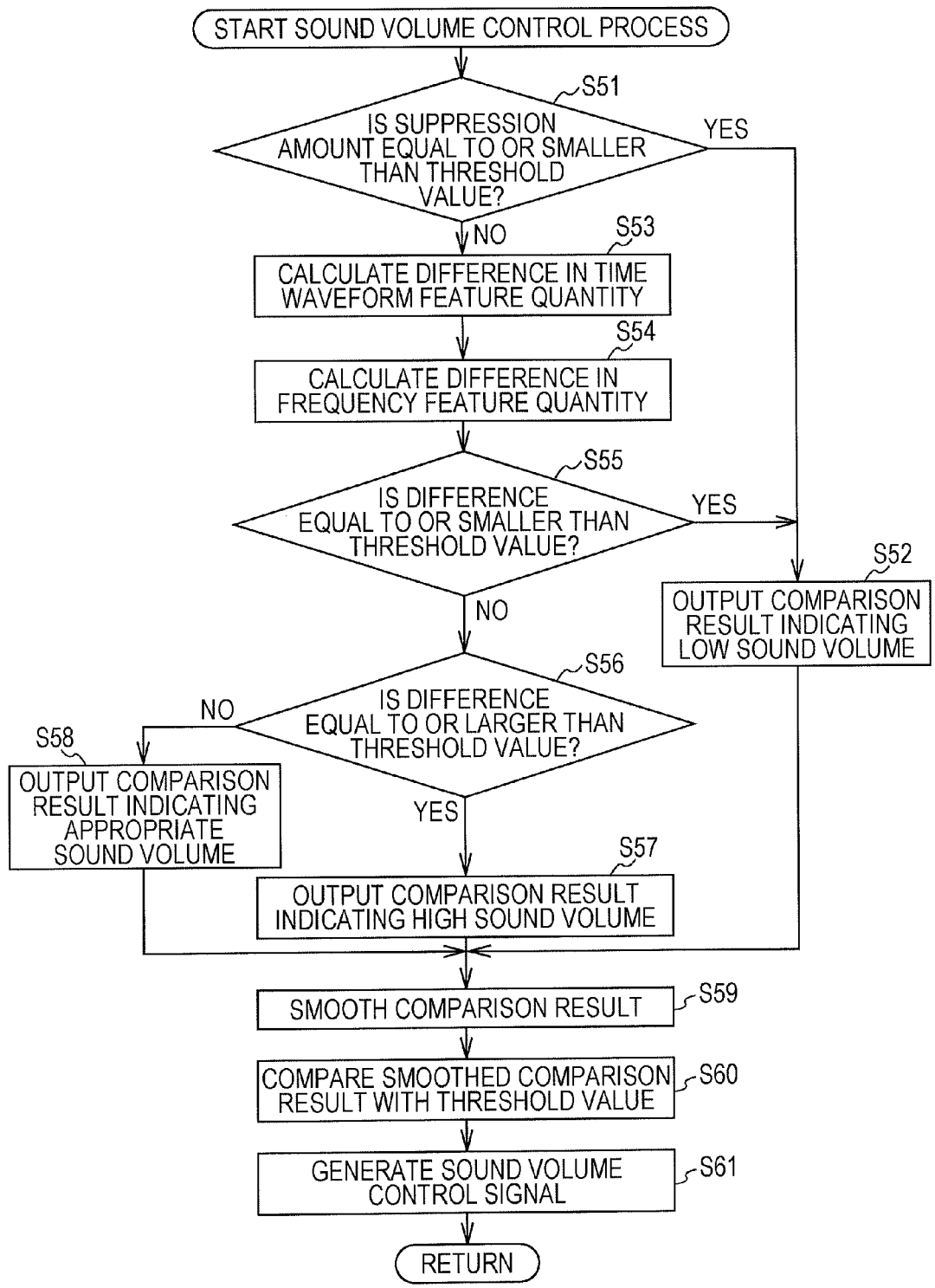
FIG. 5 is a flowchart for explaining a sound volume control process.

Description will return to the flowchart of FIG. 5. After the sound volume control signal is generated in the above-described manner and supplied from the sound volume control signal generator 63 to the sound volume adjustment unit 23, the sound volume control process is completed. Thereafter, the procedure proceeds to Step S21 of FIG. 4.

In the above-described manner, the sound volume control unit 30 compares each of the difference in the time waveform feature quantity, the difference in the frequency feature quantity, and the suppression amount with the corresponding threshold value to determine whether or not the sound volume of the ringing ringtone is suitable for the surrounding environment, and controls the sound volume in accordance with the result of the determination. With the difference in each of the feature quantities and the suppression amount compared in the above-described manner, it is possible to more reliably grasp the relationship between the surrounding environment and the ringing ringtone, and consequently to perform more appropriate sound volume control.

In the above description, the comparison result is generated by the use of the difference in the time waveform feature quantity, the difference in the frequency feature quantity, and the suppression amount. However, the comparison result may be generated by the use of only one of the differences and the suppression amount. Further, the comparison result may be generated by the combined use of arbitrary ones of the differences and the suppression amount.

Sound Quality Control Process

Figure 7:
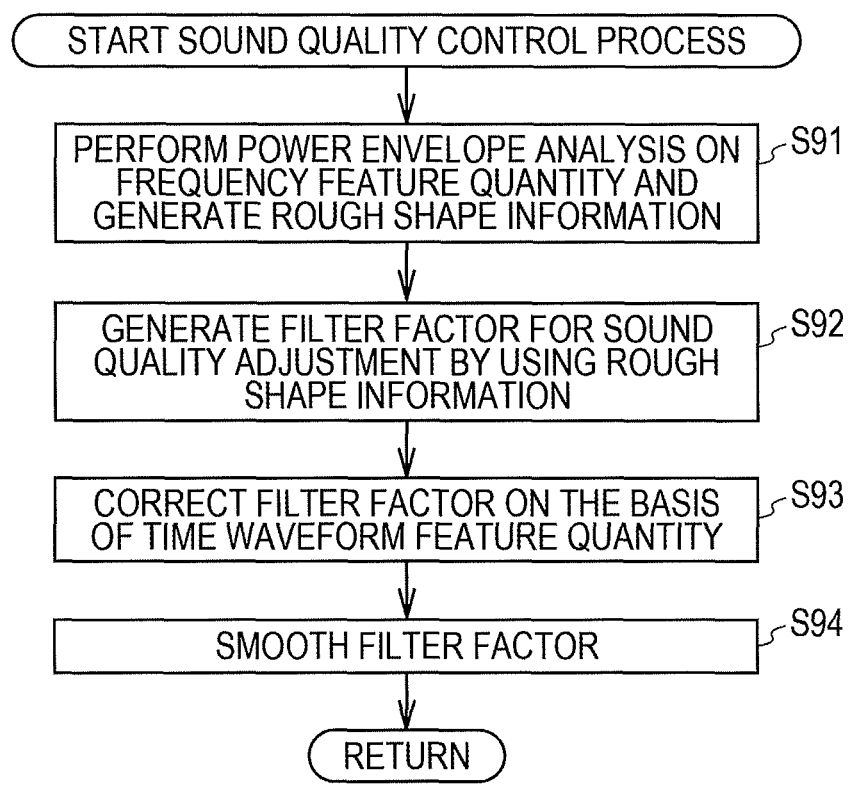
FIG. 7 is a flowchart for explaining a sound quality control process.

Subsequently, with reference to the flowchart of FIG. 7, description will be made of the sound quality control process corresponding to the process of Step S21 of FIG. 4.

At Step S91, the power envelope analysis unit 111 performs power envelope analysis on the frequency feature quantity of the estimated environmental sound supplied from the frequency power analysis unit 29, generates the rough shape information representing the rough shape of the power envelope, and supplies the rough shape information to the filter generation unit 112.

For example, the power envelope analysis unit 111 generates, as the rough shape information, the information representing a frequency band corresponding to high frequency power of the estimated environmental sound or the information of the slope of the envelope from the peak power corresponding to the maximum value among respective frequency power values.

At Step S92, with the use of the rough shape information supplied from the power envelope analysis unit 111, the filter generation unit 112 generates a filter factor for adjusting the sound quality of the ringing ringtone.

For example, if the rough shape information is the information of the slope of the envelope from the peak power, the filter generation unit 112 identifies the frequency band corresponding to high frequency power of the estimated environmental sound. Specifically, with the use of the information of the slope of the envelope, the filter generation unit 112 identifies, as the frequency band corresponding to high frequency power, a frequency band which includes the frequency corresponding to the peak power, and in which the frequency power of each of the frequencies is equal to or larger than a predetermined value. Then, the filter generation unit 112 generates a filter factor for emphasizing a frequency band one octave higher than the identified frequency band. Thereby, a band different from the high-power frequency band of the environmental sound is emphasized in the ringing ringtone, and it becomes easier for the user to catch the ringing ringtone.

At Step S93, the filter generation unit 112 corrects the filter factor on the basis of the time waveform feature quantity of the estimated environmental sound supplied from the time waveform analysis unit 27, and supplies the corrected filter factor to the smoothing unit 113.

For example, the filter generation unit 112 compares the time waveform feature quantity of the estimated environmental sound with a preset threshold value. Then, if the time waveform feature quantity is equal to or larger than the threshold value, the filter generation unit 112 multiplies the generated filter factor by a constant determined by the value of the time waveform feature quantity of the estimated environmental sound, to thereby correct the filter factor. That is, the filter factor is multiplied by a constant, the value of which is determined by the time waveform feature quantity. With the time waveform feature quantity thus analyzed, it is possible to generate a filter factor for adjusting the sound volume and the sound quality at the same time.

If the time waveform feature quantity of the estimated environmental sound is relatively large, the mobile phone 11 may be located in a noisy environment. Therefore, the filter factor is multiplied by a constant to increase the sound volume of the ringing ringtone. Thereby, it is possible to process the ringing ringtone to make it easier for the user to catch the ringing ringtone, while maintaining the waveform of the ringing ringtone. Further, if the time waveform feature quantity is smaller than the threshold value, the correction of the filter factor is not performed.

At Step S94, the smoothing unit 113 smoothes the filter factor supplied from the filter generation unit 112.

For example, the smoothing unit 113 performs the smoothing process by performing weighted addition on the filter factor supplied from the filter generation unit 112 and the past filter factor stored in the filter factor storage memory 114 and calculating the mean of the filter factors. With the filter factor thus smoothed, it is possible to suppress overreaction to an instantaneous change in the environmental sound, and to more appropriately perform the sound quality control.

The smoothing unit 113 supplies the filter factor obtained by the smoothing process to the filter factor storage memory 114 to store therein the filter factor, and supplies the filter factor to the updating unit 115 to be held therein as a new filter factor. The filter factor supplied to the updating unit 115 is supplied to and used by the sound quality adjustment unit 22 as the filter factor for sound quality adjustment.

After the filter factor is generated and supplied to the sound quality adjustment unit 22, the sound quality control process is completed. Thereafter, the procedure proceeds to Step S22 of FIG. 4.

In the above-described manner, the sound quality control unit 31 identifies a frequency band easily audible to the user in the surrounding environment by using the time waveform feature quantity and the frequency feature quantity of the estimated environmental sound, and controls the sound quality in accordance with the result of the identification. With the identification and emphasis of the frequency band easily audible to the user, it is possible to perform more appropriate sound quality control.

In the above description, the sound quality control is performed with the use of the time waveform feature quantity and the frequency feature quantity of the estimated environmental sound. However, the time waveform feature quantity or the frequency feature quantity of the ringing ringtone may also be used. For example, if the frequency feature quantity of the ringing ringtone is used, the ringing ringtone and the estimated environmental sound may be compared with each other in terms of the power envelope shape or the like to identify a frequency band allowing the user to more easily notice the ringing ringtone, and a filter factor for emphasizing the frequency band may be generated.

Further, with the use of the suppression amount obtained by the adaptive filtering process, the sound quality control unit 31 may adjust the degree of emphasis on the identified frequency band at the time of control of the sound quality, i.e., at the time of generation of the filter factor.

Second Embodiment

Configuration Example of Mobile Phone: In the above description, the estimated propagation characteristic, which indicates how the ringing ringtone is changed and transmitted from the speaker 24 to the microphone 25, is obtained by the adaptive filtering process. The estimated propagation characteristic may be used for the control of the sound volume or the sound quality of the ringing ringtone.

Further, for example, the estimated propagation characteristic may be used as an indicator, and the incoming call notification using vibration may be performed in combination with the control of the sound volume or the sound quality of the ringing ringtone.

For example, if the user carries the mobile phone 11 in a clothes pocket, a bag, or the like, the mobile phone 11 is covered by the pocket or the like, i.e., an object is in proximity to the speaker 24 or the microphone 25.

In such a case, the estimated propagation characteristic is different from the estimated propagation characteristic obtained when there is no object around the microphone 25 or the like. Specifically, the reflection of a sound, such as the ringing ringtone, is increased, and an increase in energy of the propagation characteristic and an increase in reverberation time are observed.

If an object is thus in proximity to the microphone 25 or the like, the user may be more easily notified of an incoming call by vibration, i.e., a so-called vibration function, than by the change in sound volume or sound quality of the ringing ringtone.

Therefore, if it is determined in the mobile phone 11 that an object is in proximity to the speaker 24 or the microphone 25, the incoming call notification using vibration may be performed at the same time, as well as the adjustment of the sound volume or the sound quality of the ringing ringtone.

Figure 8:
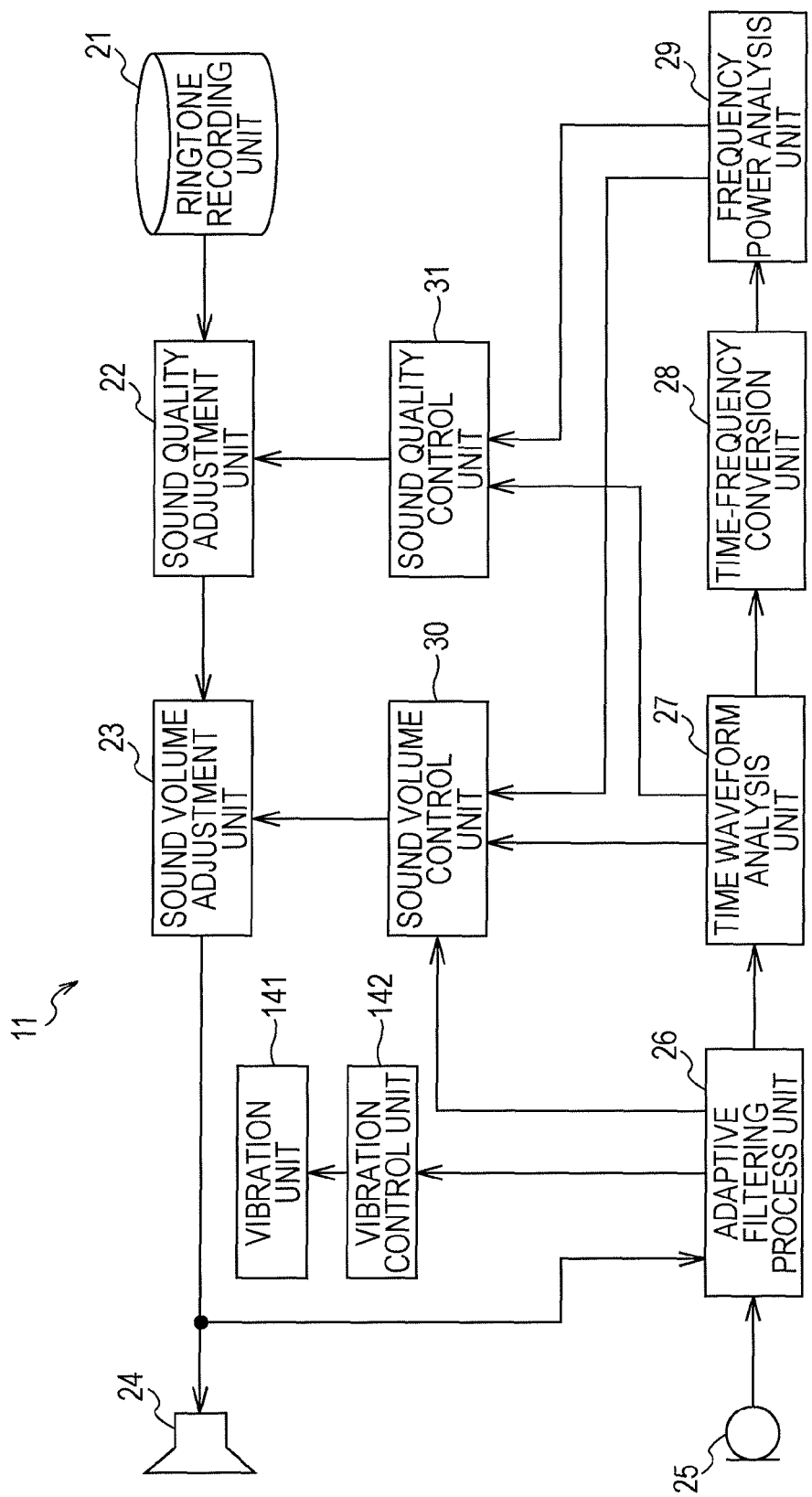
FIG. 8 is a diagram illustrating another configuration example of a mobile phone.

In this case, the mobile phone 11 is configured as illustrated in FIG. 8, for example. In FIG. 8, the components corresponding to the components of FIG. 1 are assigned with the same reference numerals, and description thereof will be omitted as appropriate. The mobile phone 11 of FIG. 8 corresponds to the mobile phone 11 of FIG. 1 further provided with a vibration unit 141 and a vibration control unit 142.

The vibration unit 141 is formed by, for example, a motor, and is driven to vibrate in accordance with the control of the vibration control unit 142. The vibration control unit 142 receives the estimated propagation characteristic obtained by the adaptive filtering process and supplied from the adaptive filtering process unit 26, and controls the vibration unit 141 on the basis of the estimated propagation characteristic.

Ringing Process

Figure 9:
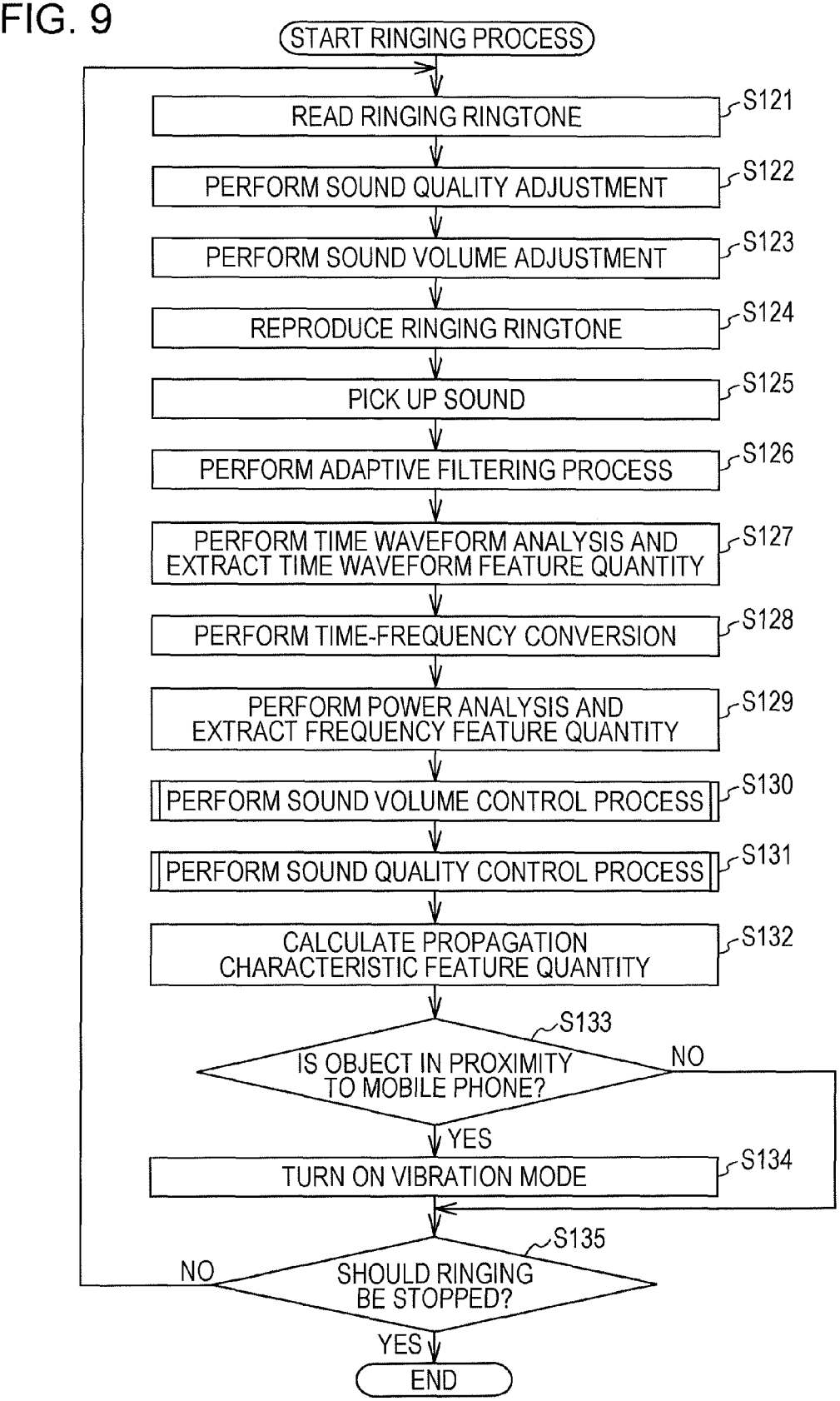
FIG. 9 is a flowchart for explaining a ringing process.

Subsequently, with reference to the flowchart of FIG. 9, description will be made of the ringing process by the mobile phone 11 illustrated in FIG. 8. The processes of Steps S121 to S131 are similar to the processes of Steps S11 to S21 of FIG. 4, respectively, and thus description thereof will be omitted.

After the sound volume and the sound quality of the ringing ringtone have been adjusted by the processes of Steps S121 to S131, the estimated propagation characteristic obtained by the adaptive filtering process is supplied from the adaptive filtering process unit 26 to the vibration control unit 142.

At Step S132, with the use of the estimated propagation characteristic supplied from the adaptive filtering process unit 26, the vibration control unit 142 calculates the propagation characteristic feature quantity representing the degree of proximity of a nearby object to the speaker 24 or the microphone 25, i.e., to the mobile phone 11.

The propagation characteristic feature quantity is, for example, the value representing the reflection amount of a sound, the energy amount of the propagation characteristic, or the reverberation time, or the value obtained by weighted addition of the value representing the above characteristic. The propagation characteristic feature quantity increases in accordance with the increase in the reflection of a sound, the energy of the propagation characteristic, or the reverberation time. Therefore, the larger the propagation characteristic feature quantity value is, the more proximate to the mobile phone 11 an object is.

At Step S133, on the basis of the calculated propagation characteristic feature quantity, the vibration control unit 142 determines whether or not an object is in proximity to the mobile phone 11. For example, if the propagation characteristic feature quantity is equal to or larger than a preset threshold value, it is determined that an object is in proximity to the mobile phone 11.

If it is determined at Step S133 that an object is in proximity to the mobile phone 11, the vibration control unit 142 at Step S134 turns on a vibration mode to cause the vibration unit 141 to vibrate and start the incoming call notification to the user by using the vibration. After the incoming call notification using the vibration, the procedure proceeds to Step S135.

Meanwhile, if it is determined at Step S133 that an object is not in proximity to the mobile phone 11, the mobile phone 11 is assumed to be in an environment in which the ringing ringtone is easily heard. Thus, the process of Step S134 is not performed, and the procedure proceeds to Step S135.

If it is determined at Step S133 that an object is not in proximity to the mobile phone 11, or if the vibration mode is turned on at Step S134, the mobile phone 11 determines at Step S135 whether or not to stop the ringing of the ringing ringtone.

If it is determined at Step S135 not to stop the ringing, the procedure returns to Step S121, and the above-described processes are repeated. Meanwhile, if it is determined at Step S135 to stop the ringing, the ringing of the ringing ringtone is stopped, and the ringing process is completed.

In the above-described manner, the mobile phone 11 performs, as well as the adjustment of the sound volume and the sound quality of the ringing ringtone, the determination of whether or not an object is in proximity to the mobile phone 11, and performs the incoming call notification by using the vibration in accordance with the result of the determination. With the incoming call notification thus performed by the vibration, as well as by the ringing of the ringing ringtone, in accordance with the circumstance around the mobile phone 11, it is possible to more reliably allow the user to notice an incoming call.

The series of processes described above can be performed by hardware or software. To have the series of processes performed by software, a program configuring the software is installed from a program recording medium into a computer incorporated in special hardware or, for example, a general-purpose personal computer capable of performing a variety of functions by installing therein a variety of programs.

Figure 10:
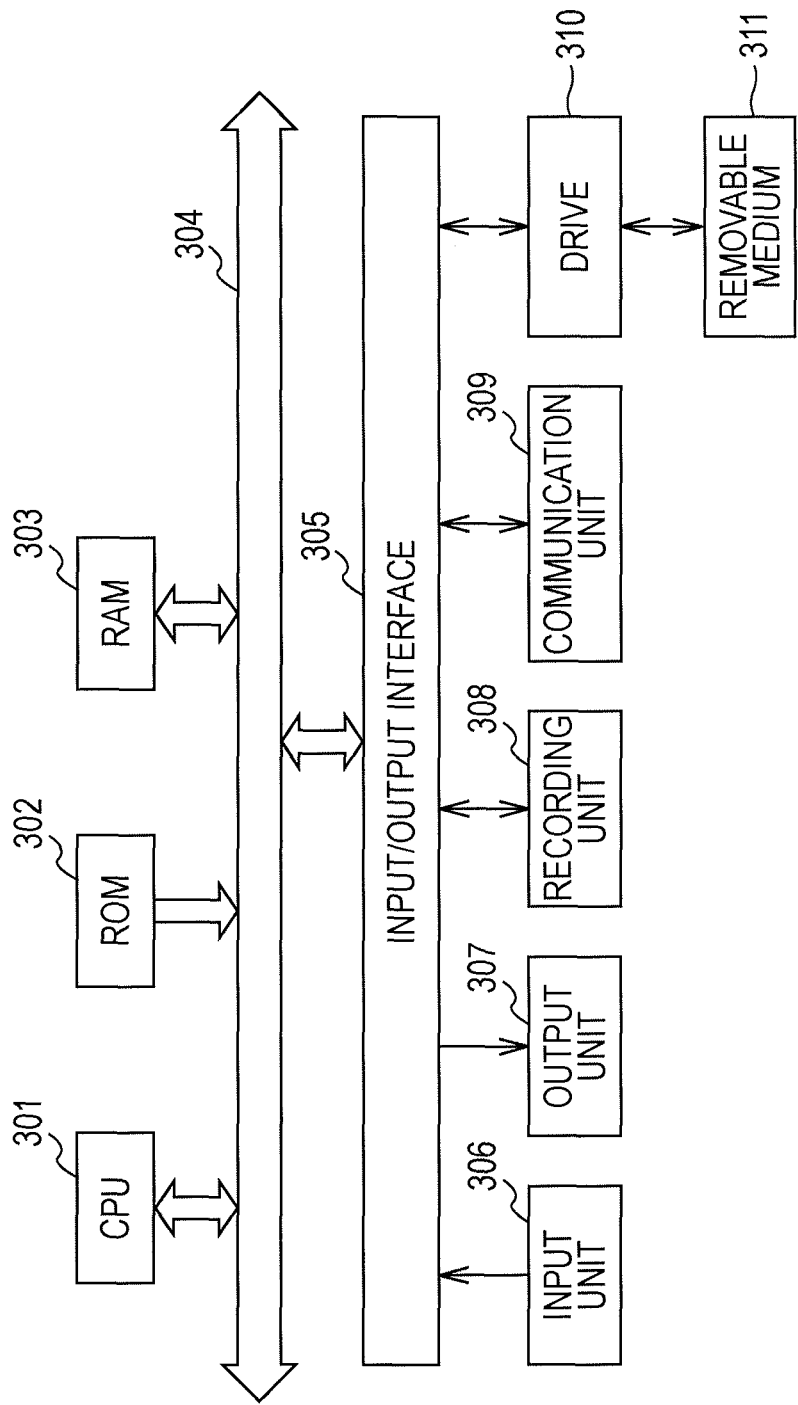
FIG. 10 is a block diagram illustrating a configuration example of a computer.

FIG. 10 is a block diagram illustrating a configuration example of the hardware of a computer which performs the above-described series of processes in accordance with a program.

In the computer, a CPU (Central Processing Unit) 301, a ROM (Read-Only Memory) 302, and a RAM (Random Access Memory) 303 are connected to one another by a bus 304.

The bus 304 is further connected to an input/output interface 305. The input/output interface 305 is connected to an input unit 306 including a keyboard, a mouse, and a microphone, an output unit 307 including a display and a speaker, a recording unit 308 including a hard disk and a nonvolatile memory, a communication unit 309 including a network interface, and a drive 310 for driving a removable medium 311, such as a magnetic disc, an optical disc, a magneto-optical disc, or a semiconductor memory.

In the computer configured as described above, the CPU 301 loads the program recorded in, for example, the recording unit 308 into the RAM 303 via the input/output interface 305 and the bus 304, and executes the program. Thereby, the above-described series of processes are performed.

The program executed by the computer (CPU 301) is provided as recorded on the removable medium 311, which is a packaged medium including, for example, a magnetic disc (including a flexible disc), an optical disc (e.g., a CD-ROM or Compact Disc-Read Only Memory and a DVD or Digital Versatile Disc), a magneto-optical disc, and a semiconductor memory. Alternatively, the program is provided via a wired or wireless transmission medium, such as a local area network, the Internet, and digital satellite broadcasting.

Further, with the removable medium 311 installed in the drive 310, the program can be installed in the recording unit 308 via the input/output interface 305. The program can also be received by the communication unit 309 via a wired or wireless transmission medium and installed in the recording unit 308. Furthermore, the program can be previously installed in the ROM 302 or the recording unit 308.

The program executed by the computer may be a program, the processes of which are chronologically performed in the order described in the present specification, or a program, the processes of which are performed concurrently or at necessary timing, such as upon invocation of the program.

The present application contains subject matter related to that disclosed in Japanese Priority Patent Application JP 2010-032045 filed in the Japan Patent Office on Feb. 17, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
a hardware processor; and
a memory storing instructions, wherein the hardware processor executes the instructions to:
estimate an environmental sound by removing from a received ambient sound a ringing sound included in the ambient sound;
determine a time feature quantity for the estimated environmental sound and the ringing sound using a time waveform analysis of the estimated environmental sound and the ringing sound;
determine a frequency feature quantity for the estimated environmental sound and the ringing sound using a frequency waveform analysis of the estimated environmental sound and the ringing sound;
compare the time feature quantities of the estimated environmental sound and the ringing sound to determine a time feature quantity difference;
compare the frequency feature quantities of the estimated environmental sound and the ringing sound to determine a frequency feature quantity difference; and
adjust a sound quality of the ringing sound to be output based on the time feature quantity difference and the frequency feature quantity difference, wherein adjusting the sound quality of the ringing sound includes:
identifying a highest power frequency band of the estimated environmental sound; and
emphasizing a frequency band of the ringing sound which is different from the highest power frequency band of the estimated environmental sound.

2. The information processing device according to claim 1, wherein the hardware processor is further configured to obtain a suppression amount of the ambient sound and adjust the sound volume of the ringing sound based on the suppression amount.

3. The information processing device according to claim 1, wherein the hardware processor is further configured to:
provide notification to a user of the information processing device,
calculate a propagation characteristic of the ringing sound between an output end and an input end, wherein the propagation characteristic represents a degree of proximity of a nearby object to the information processing device, and
control vibration on the basis of the propagation characteristic.

4. The information processing device according to claim 1, serving as a mobile phone,
wherein the ringing sound is sound for notifying a user of an incoming call, and wherein the information processing device further includes a microphone for picking up the voice of the user during a telephone conversation using the mobile phone.

5. The information processing device according to claim 1, wherein the frequency difference between the highest power frequency band of the estimated environmental sound and the emphasized frequency band of the ringing sound is at least one octave.

6. An information processing method performed by an information processing device, the method comprising:
   estimating an environmental sound by removing from a received ambient sound a ringing sound included in the ambient sound;
   determining a time feature quantity for the estimated environmental sound and the ringing sound using a time waveform analysis of the estimated environmental sound and the ringing sound;
   determining a frequency feature quantity for the estimated environmental sound and the ringing sound using a frequency waveform analysis of the estimated environmental sound and the ringing sound;
   comparing the time feature quantities of the estimated environmental sound and the ringing sound to determine a time feature quantity difference;
   comparing the frequency feature quantities of the estimated environmental sound and the ringing sound to determine a frequency feature quantity difference; and
   adjusting a sound quality of the ringing sound to be output based on the time feature quantity difference and the frequency feature quantity difference, wherein adjusting the sound quality of the ringing sound includes:
      identifying a highest power frequency band of the estimated environmental sound; and
      emphasizing a frequency band of the ringing sound which is different from the highest power frequency band of the estimated environmental sound.

7. A non-transitory computer-readable storage medium storing instructions for enabling a computer to implement the following steps:
   estimating an environmental sound by removing from a received ambient sound a ringing sound included in the ambient sound;
   determining a time feature quantity for the estimated environmental sound and the ringing sound using a time waveform analysis of the estimated environmental sound and the ringing sound;
   determining a frequency feature quantity for the estimated environmental sound and the ringing sound using a frequency waveform analysis of the estimated environmental sound and the ringing sound;
   comparing the time feature quantities of the estimated environmental sound and the ringing sound to determine a time feature quantity difference;
   comparing the frequency feature quantities of the estimated environmental sound and the ringing sound to determine a frequency feature quantity difference; and
   adjusting a sound quality of the ringing sound to be output based on the time feature quantity difference and the frequency feature quantity difference, wherein adjusting the sound quality of the ringing sound includes:
      identifying a highest power frequency band of the estimated environmental sound; and
      emphasizing a frequency band of the ringing sound which is different from the highest power frequency band of the estimated environmental sound.

8. An information processing device comprising:
an output device configured to perform notification to a user by outputting a ringing sound;
a sound pickup device configured to pick up surrounding sound as ambient sound;
a hardware processor; and
a memory storing instructions, wherein the hardware processor executes the instructions to:
   estimate an environmental sound by removing from the ambient sound the ringing sound included in the ambient sound;
   determine a time feature quantity for the estimated environmental sound and the ringing sound using a time waveform analysis of the estimated environmental sound and the ringing sound;
   determine a frequency feature quantity for the estimated environmental sound and the ringing sound using a frequency waveform analysis of the estimated environmental sound and the ringing sound;
   compare the time feature quantities of the estimated environmental sound and the ringing sound to determine a time feature quantity difference;
   compare the frequency feature quantities of the estimated environmental sound and the ringing sound to determine a frequency feature quantity difference; and
   adjust a sound quality of the ringing sound to be output based on the time feature quantity difference and the frequency feature quantity difference, wherein adjusting the sound quality of the ringing sound includes:
      identifying a highest power frequency band of the estimated environmental sound; and
      emphasizing a frequency band of the ringing sound which is different from the highest power frequency band of the estimated environmental sound.

* * * * *